Figure 1:
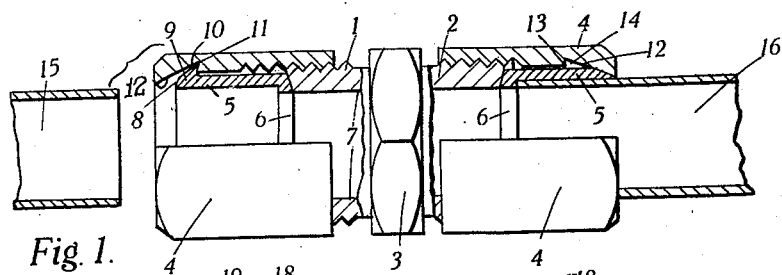

Feb. 25, 1941. B. N. R. LAMONT 2,233,214
MEANS FOR COUPLING TOGETHER PIPES, TUBULAR BODIES, AND THE LIKE
Filed May 24, 1939    2 Sheets-Sheet 1

Inventor
B.N.R. LAMONT
by
Attorneys

Feb. 25, 1941.    B. N. R. LAMONT    2,233,214
MEANS FOR COUPLING TOGETHER PIPES, TUBULAR BODIES, AND THE LIKE
Filed May 24, 1939    2 Sheets-Sheet 2
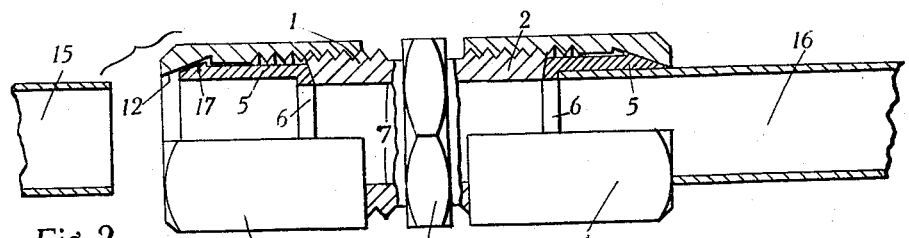
Fig. 2.
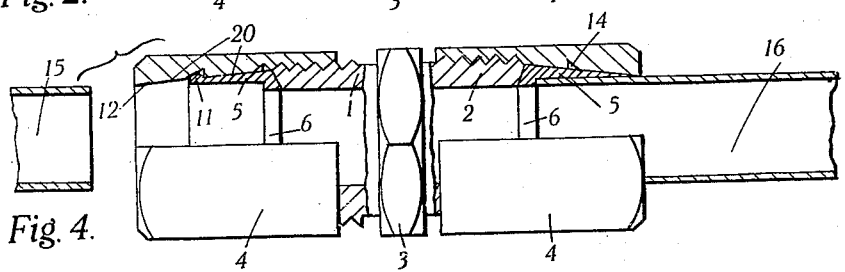
Fig. 4.
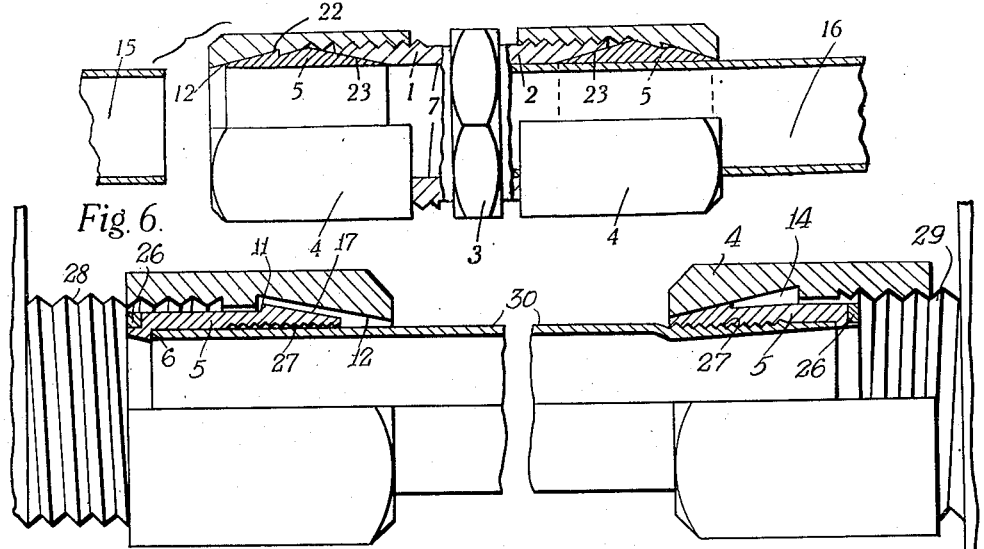
Fig. 6.
Fig. 8.
Inventor
B. N. R. LAMONT,
by
Attorneys Patented Feb. 25, 1941

2,233,214

UNITED STATES PATENT OFFICE 2,233,214

MEANS FOR COUPLING TOGETHER PIPES, TUBULAR BODIES, AND THE LIKE

Boyd Neil Robert Lamont, Wimbledon, London, England, assignor to Tube Patents Limited, Wimbledon, London, England, a British company Application May 24, 1939, Serial No. 275,518
In Great Britain May 28, 1938

5 Claims. (Cl. 285—166)

This invention relates to improvements in or relating to a method of and means for coupling together pipes, tubular bodies and the like (hereinafter referred to as "pipes or the like"), one of the objects of the present invention being to provide a simple and efficient method of effecting a fluid-tight compression joint and another object being to provide coupling means which are more simple to manipulate than known coupling devices.

According to one aspect of the present invention I provide a method of coupling together two or more pipes or the like involving the use of a deformable sealing member or ferrule (hereinafter referred to as a "ferrule") wherein said ferrule is initially retained within one of said pipes or the like or within an associated coupling device, for instance a coupling nut, by means opposing its longitudinal separation and wherein said means are automatically freed during a coupling operation thereby facilitating subsequent disassembly of the coupling.

According to another aspect of the present invention I provide a means for coupling pipes or the like including a screw-threaded nut the bore of which receives or is adapted to receive a sealing ferrule, said nut and said sealing ferrule having surfaces adapted to co-operate so as to cause said ferrule to be compressed radially as said nut is caused to traverse therealong, and means adapted normally to oppose separation of said nut and said ferrule after they have been brought into co-operative relationship whilst permitting rotary movements therebetween, but to be rendered inoperative by urging said nut along said ferrule for example by the screwing of said nut upon a pipe or the like to be coupled.

According to yet another aspect of the present invention I provide means for coupling together two pipes or the like including a nut adapted to make screw-threaded engagement with one of said pipes or the like and to receive a ferrule which is itself adapted to receive the end of the other pipe or the like and to be pressed into fluid-tight engagement therewith by the screwing of said nut upon said first mentioned pipe or the like, wherein means are provided for opposing longitudinal separation of said ferrule from said nut or from said first mentioned pipe or the like after those parts have been brought into co-operating relationship whilst permitting relative rotary movements therebetween and wherein said means are adapted to be rendered inoperative by making said screw-threaded engagement between said nut and said pipe or the like.

According to a still further aspect of the present invention I provide a coupling for pipes or the like comprising a coupling unit having two or more externally screw-threaded bosses, union nuts adapted to make screw-threaded engagement with said bosses, ferrules adapted to be located within said nuts and to receive the respective ends of the pipes or the like to be interconnected, and means whereby longitudinal separation of said ferrules either from said bosses or from said nuts is opposed after said parts have been brought into co-operative relationship, said means being adapted to be rendered inoperative by screwing said nuts on to said bosses.

The means for normally retaining a ferrule within an associated nut or an associated pipe or the like may comprise a ridge, bead, series of projections, or the like (hereinafter referred to as a "ridge") provided circumferentially around said ferrule and co-operating with a complementary groove, depression, recess or the like (hereinafter referred to as a "recess") provided in said nut or in said pipe or the like as the case may be.

The aforesaid sealing ferrule or each of the aforesaid ferrules may be substantially in the form of a single or double truncated cone and the aforesaid ridge may be provided at any suitable part thereof; thus for example a ridge may be provided near to either the inner or the outer end of the ferrule or approximately midway therebetween.

The natural resiliency of the material from which the ferrule is made may be relied upon for enabling the ridge to be sprung into the co-operating recess or alternatively the dimensions of the ferrule may be such that it can be freely passed into the receiving nut or pipe as the case may be and the material part thereof may then be expanded with the aid of any suitable tool so as to cause said ridge to make engagement with said recess.

The particular dimensions and shape of the sealing ferrule employed in any particular case may to some extent vary to suit the use to which the device is to be put. Thus, for instance, for coupling together pipes having smooth surfaces the end or each end of the ferrule may taper to a feather edge whereas for coupling together pipes having a relatively rough surface the end or ends of the sealing member may advantageously be rounded so as to provide more material for efficiently filling the surface irregularities of said pipes.

The present invention can advantageously be applied to a large number of different purposes. Thus, for instance, it may serve to couple together two pipes one of which is screw-threaded and the other of which is to be coupled by means of a compression joint or it may serve to couple together two pipes, each of which is to be secured to a coupling unit by means of a compression joint or it may serve to couple a pipe to a screw-threaded spigot or the like by means of a compression joint.

The sealing ferrules will generally be made from material which is softer than that from which the associated nut is made so that during a coupling operation the ferrules will be deformed by the nut although by suitably proportioning said parts, e. g., by making the wall of the nut thicker than the wall of the sealing member, it may be possible to employ the same material for both parts or even a harder material for the ferrule.

I find that in some cases it is desirable to make provision for appreciable sliding movement between the sealing ferrule and the nut. Thus, for instance, in cases where it is desired to couple together two pipe-ends which are in fixed positions in relation to each other it is desirable to make provision whereby the sealing ferrule is free to slide longitudinally with respect to the associated nut into a position in which the outer end of the ferrule is flush or substantially flush with the corresponding end face of said nut and into a position in which said end is located within said nut. In this way it is ensured that those parts of a coupling which should make butt joints for best results can come into contact with each other during a coupling operation. In cases therefore where means are provided for normally retaining a ferrule within the associated nut, said means are so disposed that latitude is given for the desired sliding movement.

The internal surfaces of the ferrules employed in carrying out the present invention may be provided with serrations or the like, for example circumferentially, in order to facilitate the making of tight joints with the pipes to which the ferrules are to be applied.

A ferrule according to the present invention may be provided with a relatively soft sealing surface over the portion with which it is desired that a butt joint should be made. Thus, for instance, a sealing washer of copper or other suitable material may be located in a recessed or stepped portion provided at one end of the ferrule and the bore of the ferrule may be slightly expanded or other steps may be taken for the purpose of securing such washer in position.

The aforesaid sealing washer may, if desired, have a forwardly inclined rim portion, such an arrangement being advantageous when, for instance, the surface against which the sealing member makes a butt joint is roughened, worn or otherwise deformed.

In order that the present invention may be well understood I will now describe some embodiments thereof by way of examples only and with reference to the accompanying drawings wherein Figures 1 to 7 show longitudinal sectional views of seven forms of couplings serving for the connection of two pipes by means of compression joints and Figure 8 shows one example of coupling means, particularly suitable for coupling together two pipe-ends in relatively fixed positions. In all the figures the nuts shown on the left hand side are in an intermediate stage in the process of making a coupling whilst the nuts shown on the right hand side are in their tightened positions.

In the example shown in Figure 1 the coupling means comprise a coupling unit having two longitudinally aligned and externally screw-threaded bosses 1 and 2, the centre part of the unit preferably including, as shown, a flat-sided portion 3 adapted to be received by a key or spanner during the making or breaking of the coupling. For each of the bosses 1 and 2 there is provided a coupling nut 4 within which is a cylindrical sealing ferrule 5 made of a suitable ductile metal, as brass or copper. The ends of the bosses 1 and 2, which are preferably concavely conical as shown, serve as abutments for limiting the inward movement of the ferrules, and the contacting ends of the ferrules preferably include, as shown, inturned flanges 6 which fit against the adjacent end surfaces of the bosses 1 and 2, the bore formed by the edge of each flange preferably corresponding to the bore 7 of the coupling unit. The outer end of each ferrule 5 is provided with a bead 8 having a rounded outer surface 9 and a shoulder 10 extending a little above the main surface of the ferrule so as to form a sharp ridge 11 therearound as shown on the left hand side of Figure 1. Each nut 4 has at its outer end a divergent conical bore 12 terminating at a small shoulder 13 (as shown on the right hand side of Figure 1) extending outwardly from the bore of the nut. The beaded end of each of the ferrules 5 can pass freely into the entrance to the associated nut 4, and by giving the ferrule a sharp tap the circumferential ridge 11 can be caused to pass a part of slightly reduced diameter into a recess 14 (see the right hand portion of Fig. 1) formed in the nut 4 by the bore 12 and the shoulder 13, and the beaded edge then rests in the recess 14 as shown on the left hand side of Figure 1 and abuts against the conical bore 15 of the coupling nut. The pipes 15 and 16 to be coupled together are then inserted into the respective sealing ferrules 5 and the ends of those pipes are abutted against the inturned flanges 6 provided at the inner ends of the ferrules. The respective coupling nuts are then screwed upon the screw-threaded bosses 1 and 2 of the coupling unit. The nuts 4 are thus caused to traverse longitudinally along the respective ferrules 5, and, as the conical parts at the outer ends of the nuts progress with respect to the ridges 11 said ridges are depressed as shown on the right hand side of Figure 1 and the associated parts are tightly compressed upon the pipes, the pipes themselves in some cases undergoing deformation dependent to some extent on the pressure applied to the nuts and the material of which the pipes are made. In this way the ferrules 5 are entirely freed from any engagement with the recesses 14 in the coupling nuts.

It will be readily appreciated that in the example shown in Figure 1 the sealing ferrules 5 are urged into the associated nuts 4 prior to the parts being used for making a joint, with the result that each nut 4 and the corresponding ferrule become in effect a single unit, so reducing the number of free parts usually employed in making compression joints and removing the possibility of the sealing ferrules 4 being dropped during the process of making a joint. It will further be appreciated that as a result of the freeing of the mechanical connection between the recesses in the nuts 4 and the corresponding ferrules during the tightening of the coupling nuts, the latter can be easily loosened when the necessity arises for breaking the joint, although the ferrule itself will probably grip the associated pipe very tightly and separation of the parts would accordingly be very difficult if the ferrules remained in engagement with the recesses in the nuts.

If desired, the bosses shown in Figure 1 may be recessed so as to receive part of the cylindrical portion of the respective ferrules but alignment of the parts is facilitated by employing the arrangement shown.

In the example shown in Figure 2, which is a modification of that shown in Figure 1, but in which several parts are similar and accordingly designated by the corresponding reference numerals used on Figure 1 the outer edges of the ferrules 5, instead of being rounded or provided with beads, include conical surfaces 17 corresponding to the conical bores 12 of the outer ends of the coupling nuts 4. In such cases, however, there may be a reduced amount of metal available for filling any irregularities in the surface of a pipe inserted therein and such embodiments may not therefore be so suitable for use with pipes having a relatively rough or grooved surface.

Figure 3:
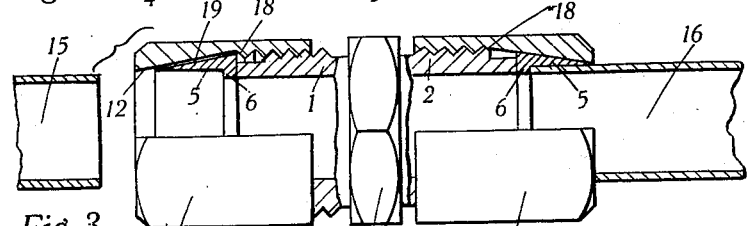

In the example shown in Figure 3 the device is similar to that shown in Figure 2 with the alteration that each conical part 12 of the bore of each coupling nut 4 extends to the inner end of the threaded portion 18 of that nut, and the thread itself thus serves as an abutment past which the ridge formed by the edge 19 of the conical exterior of the ferrule 5 can be forced, as shown on the left hand side of Figure 3, but which will prevent free withdrawal of the ferrule until the coupling nut has been tightened and that edge has consequently been reduced in diameter as shown in the right-hand portion of the figure.

In the example shown in Figure 4 the coupling nuts include relatively long conical portions 20 and a circumferential groove 14 (as shown at the right hand side of Figure 4) is formed at about the centre of each portion, said groove being adapted to receive the edge of a bead 11 initially projecting from the ferrule 5. When this bead is caused to collapse as shown in the right hand side of Figure 4 by tightening the nut 4 there results a relatively large bearing area between the ferrule and the associated nut and pipe and this is very advantageous for some applications.

Figure 5:
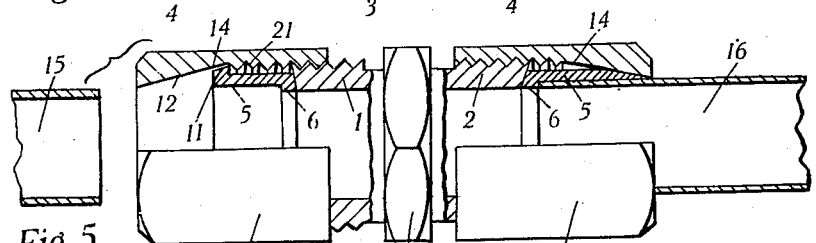

In the example shown in Figure 5 the outer end of each ferrule 5 is provided with an outstanding ridge or rim 11 of substantially square or rectangular cross-section and each retaining recess 14 is formed by the junction between the conical bore 12 of the respective nuts and the end of the screw-threaded portion 21 thereof.

In the example shown in Figure 6 each ferrule is in the form of a double truncated cone and the desired circumferential ridge is formed by a step 22 in the outer conical surface and a corresponding recess is formed in the conical part 12 of the bore of the coupling unit. Each of the bosses 1 and 2 preferably includes a conical bore, as shown at 23, corresponding with the inner conical surface of the adjacent ferrule.

Figure 7:
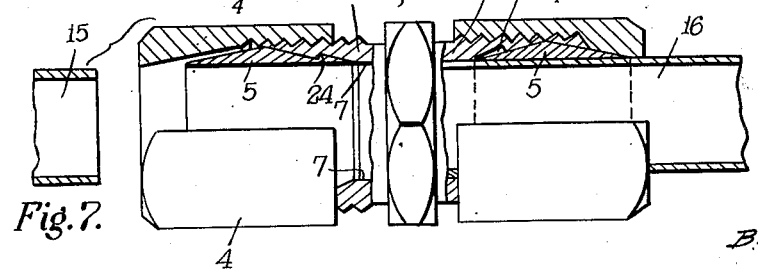

In the embodiments so far described the sealing ferrules are initially retained in the coupling nuts but the ferrules may, if desired, be normally retained within one of the parts to be couped. Thus, for example, the embodiment shown in Figure 7 illustrates how the ferrules may be initially retained in a coupling unit of the kind shown in the earlier figures. In this further embodiment the sealing ferrules are in the form of double truncated cones similar to those shown in Figure 6, a step 24 being provided in that part of the conical surface of each ferrule which is presented to the coupling unit and a co-operating recess 25 being provided in the bore 8 of the coupling unit. The bore 7 includes a part of conical form corresponding to the associated part of the sealing ferrule so that the ridge 24 is trapped in the recess 25 and so that the screwing of the nut 4 upon the boss 1 or 2 will release said ridge 24 from the recess 25. This release may be effected by providing appropriate clearances between the ferrule and the associated boss for the former to move longitudinally within the latter and/or by deformation of the associated pipe and permitting the shell of the ferrule to move inwardly in a radial direction.

Figure 8 shows an arrangement suitable for coupling together two relatively fixed bodies such as the ends of two fixed pipes. The coupling means comprise an interconnecting pipe to each end of which is slidably applied a coupling nut 4 and associated sealing ferrule 5. The left-hand ferrule 5 is shown in the position assumed before the associated nut is screwed to the pipe 31 and the right-hand ferrule is shown in the position and form assumed when the nut is tightly applied.

The ferrules employed in the embodiment shown in Figure 8 are in general similar to those shown in Figure 2 in the sense that they include cylindrical body portions, ridges 11, conical portions 17 and inwardly directed flanges 6. The recesses for the ridges 11 are also formed by conical bores 12 meeting a shouldered medial portion in the bores of the nuts but the clearance between the surfaces 12 and 17 is materially greater in the arrangement shown in Figure 8 than it is in the arrangement shown in Figure 2. This clearance is such that the ferrule after being inserted in the nut with the ridge 11 trapped in the enlarged bore of the nut can nevertheless slide from a position in which the cylindrical end is located within the bore of the nut and exposes sufficient screw thread for starting a screwed connection into the position shown at the left-hand side of Figure 8 i. e., where said cylindrical end of the ferrule is flush with the back end of the nut.

The ferrules shown in Figure 8 are further modified in that their rear ends are provided with washers 26 made from copper or other suitable material serving to assist in making a fluid-tight joint. These washers may have flat outer surfaces, as shown, or they may have inclined, convex or concave surfaces as may be desired and they may be secured in any convenient way such for example as by being inserted in the recesses shown in Figure 8 and gripped by expanding the bores of the ferrules. It is to be understood that sealing washers similar, for instance, to those shown in Figure 8 may, if desired, be applied to the ferrules shown in Figures 1 to 7.

The bores of the ferrules shown in Figure 8 are provided with serrations 27 which may, for instance, extend circumferentially, such serrations serving to assist in making a tight joint with the pipe 33 if this is made of relatively soft material. Such serrations may, of course, also be provided in the ferrules shown in Figures 1 to 7 if desired.

Assuming that it is desired to connect the screwed pipe ends 28 and 29 with the aid of the coupling shown in Figure 8, a nut 4 with the associated ferrule trapped therein is passed over each end of the connecting pipe 30, the length of such pipe being such that when the ferrules are applied with their inturned flanges abutting against the ends of said pipe 30 the overall length is just equal to the distance between the pipe ends 28 and 29. The nuts 4 owing to the provision for free sliding movement over a limited range can be urged into positions in which they do not overhang the ferrules 5 and they are therefore moved into the position shown at the left-hand side of Figure 8. The assembly consisting of the ppie 30 and the two nuts and their ferrules can thus be passed between the pipe ends 28, 29 and by pressing the nuts outwardly and at the same time rotating them the screwed connection with said pipe ends can be easily initiated. During the early part of the screwing operation the nuts will merely slide with respect to the sealing ferrules but continued rotation after the surfaces 12 and 17 first make contact will result in deformation taking place as in the manner described with reference to some of the earlier embodiments, i. e., the ridge 11 will move out of registration with the associated recess in the nut by the ferrule being forcibly urged along the conical bore of the nut, the tube itself in some cases also being inwardly compressed, for instance, as shown in a somewhat exaggerated manner at the right-hand side of Figure 8.

In a modification of the arrangement shown in Figure 8 the conical bore 12 instead of extending to the shoulder defining one limit position of the ferrule may merely extend to a cylindrical portion of a diameter equal to that of the ridge 11 and of a width equal to the length of the desired longitudinal play of the ferrule within the nut. By adopting this construction the thickness of the shell of the nut need not be reduced to the extent shown in Figure 8.

Whilst some examples of coupling means according to the present invention have been hereinbefore described it is to be understood that the particular details may be varied or modified without departing from the scope of such invention. Thus, for instance, the nut and ferrule assemblies shown in Figures 1 to 6 may be employed for making direct connection between two pipes one of which is screw-threaded in which case the screw-threaded coupling unit would not be required. Moreover, the coupling nut and ferrule assembly shown in Figure 8 may be used in conjunction with coupling units as shown in Figures 1 to 6 or provision may be made for limited sliding movement of the respective ferrules in any other convenient way. Further, coupling means according to the present invention may be used for coupling together two pipes which are not necessarily in alignment or for coupling together more than two pipes or other tubular bodies. For instance, instead of a straight coupling unit as shown in Figures 1 to 8 a unit in the form of a bend or elbow may be used or one in the form of a T or cross. Similarly in place of the straight pipe 33 a curved pipe or a T or other form of junction may be employed.

I claim:

1. Pipe coupling means comprising in combination a nut adapted to make screw-threaded engagement with an externally screw-threaded tubular body, a sealing ferrule located within said nut and adapted to receive one end of a pipe to be connected to said tubular body, cooperating inclined surfaces on the outer surface of said sealing ferrule and on the inner surface of said nut whereby as said nut is screwed to said tubular body said sealing ferrule is compressed inwardly, and a ridge and recess connection between said sealing ferrule and said nut whereby to prevent their inadvertent separation whilst permitting of their free relative rotation, said ridge and recess connection being rendered inoperative by the operation of screwing said nut to said tubular body.

2. Pipe coupling means comprising in combination a nut adapted to make screw threaded engagement with an externally screw-threaded tubular body, a sealing ferrule located within said nut and adapted to receive one end of a pipe to be connected to said tubular body, cooperating inclined surfaces on said nut and on said sealing ferrule whereby said sealing ferrule is compressed inwardly as said nut is screwed to said tubular body, a ridge extending outwardly from said sealing ferrule, and a recess in the internal surface of said nut, said recess serving to trap said ridge thus preventing inadvertent separation of said sealing ferrule from said nut although permitting of free rotation of said ferrule within said nut and said recess further being of such a width that said ferrule can slide within said nut into a position in which its outer end is flush with the associated end face of the nut and into a position in which said end of the ferrule is located within said nut by a distance exposing the desired screw-threaded part for engagement with said tubular body.

3. Pipe coupling means comprising in combination a nut adapted to make screw-threaded engagement with an externally screw-threaded tubular body, a sealing ferrule located within said nut and adapted to make butt ended contact with the end of said tubular body and to receive one end of a pipe to be connected to said tubular body, cooperating inclined surfaces on said nut and on said sealing ferrule whereby said ferrule is compressed inwardly as said nut is applied to said tubular body, a ridge extending outwardly from said tubular body, a recess in the bore of said nut adapted to receive said ridge and so prevent inadvertent separation of said ferrule from said nut, said recess being of a width permitting limited longitudinal sliding movement of said sealing ferrule within said nut until said nut is tightly applied to said tubular body whereupon said ridge is deformed and the subsequent easy separation of said ferrule from said nut is permitted.

4. As a new and useful article of manufacture a coupling nut, a sealing ferrule located within said nut, cooperating inclined surfaces on said nut and on said ferrule whereby as said nut is urged in one direction along said ferrule the latter is compressed, a ridge extending outwardly from said ferrule, and a recess in the bore of said nut for receiving said ridge and so preventing inadvertent separation of said ferrule from said nut whilst permitting of free rotation of said ferrule with respect to said nut, said ridge moving out of registration with said groove when said nut is moved with respect to said ferrule in a direction causing compression of the latter thereby freeing said ferrule for withdrawal from said nut.

5. As a new and useful article of manufacture a coupling nut, a sealing ferrule located within said nut, cooperating inclined surfaces on said nut and on said ferrule whereby as said nut is urged in one direction along said ferrule the latter is compressed, a ridge extending outwardly from said ferrule, and a recess in the bore of said nut for receiving said ridge and so preventing inadvertent separation of said ferrule from said nut whilst permitting of free rotation of said ferrule with respect to said nut and also permitting of limited sliding movement of said ferrule with respect to said nut, said ridge moving out of registration with said groove when said nut is moved with respect to said ferrule in a direction causing compression of the latter thereby freeing said ferrule for withdrawal from said nut.

BOYD NEIL ROBERT LAMONT.